July 8, 1924.
W. A. KING
LUGGAGE CARRIER FOR VEHICLES
Filed May 24, 1923
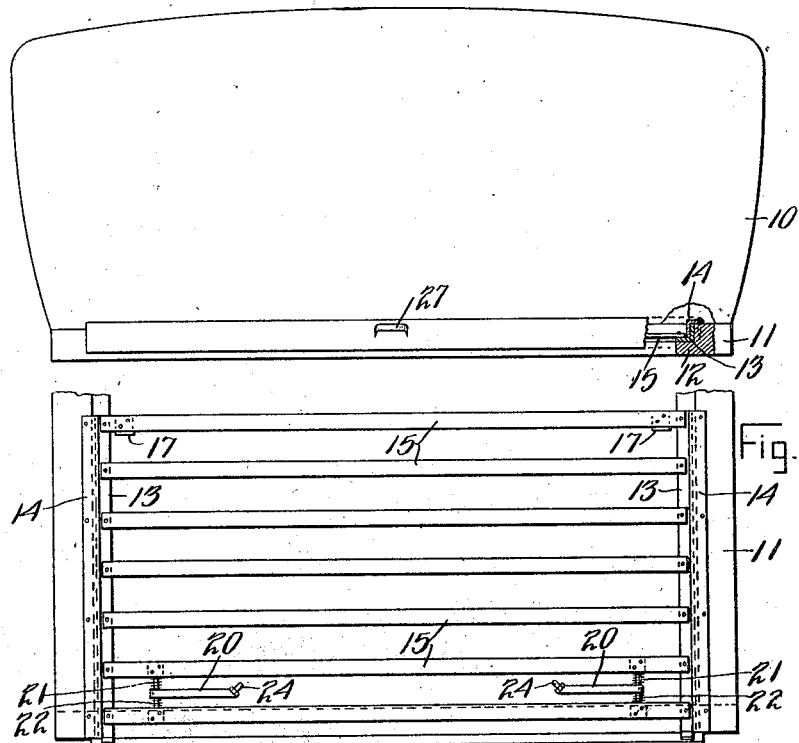
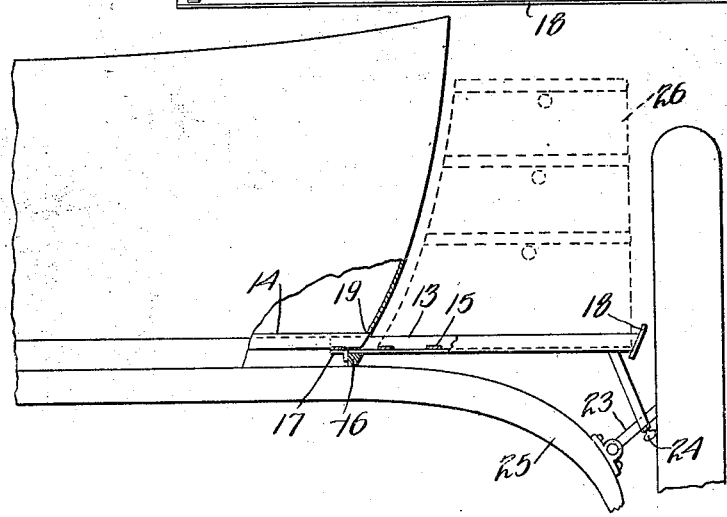
William A. King, Inventor.

Patented July 8, 1924.

1,500,945

UNITED STATES PATENT OFFICE.

WILLIAM A KING, OF SEATTLE, WASHINGTON.

LUGGAGE CARRIER FOR VEHICLES.

Application filed May 24, 1923. Serial No. 641,203.

*To all whom it may concern:*

Be it known that I, WILLIAM A. KING, a citizen of the United States, residing at Seattle, in the county of King and State of Washington, have invented certain new and useful Improvements in Luggage Carriers for Vehicles, of which the following is a specification.

My said invention relates to a luggage carrier for vehicles and it is an object of the invention to provide a disappearing carrier which can be projected when desired for supporting a trunk or the like or which can at will be located under the body of the vehicle. Such carriers are used mainly in automobiles and the device is therefore illustrated in connection with a part of an automobile body.

A further object of the invention is to provide a disappearing trunk rack which when projected can be securely held in place.

Referring to the accompanying drawings which are made a part hereof and on which similar reference characters indicate similar parts, Figure 1 is a rear elevation of an automobile body, Figure 2, a plan of the trunk rack, and Figure 3 a partial side elevation of an automobile showing the device in use.

In the drawings reference character 10 indicates generally the body of an automobile having side sills 11 cut away to provide inner ledges 12 on which the opposite side members 13 of the rack are supported. Cleats 14 are secured to the sills to hold the members 13 in place, the parts being so arranged as to permit horizontal sliding of the rack. The side members 13 are connected by a plurality of cross bars 15 forming the bottom of the rack. At the forward end of the rack there are a pair of depending bracket members or stops 17 attached to the foremost cross bar 15 adapted to contact a cross bar 16 attached to the underside of the sills at their rear ends for limiting the rearward movement of the rack. At the rear end of the rack is a member 18 inclined at the same angle as the rear part of the body and lying beneath and in the same plane with the rear plate 19 of the body so as to close the space and conceal the carrier when in its inner or disappearing position.

A pair of latches 20 are pivotally supported midway between two of the bars 15 by means of pins 21 fixed to said bars. Springs 22 surround these pins at each side of the latches for holding them in central position and for yieldingly resisting relative movement of the rack and the bars 23 of the luggage carrier under which the latch is engaged. Set screws 24 are provided on the latches, these screws being adapted to engage the bars 23 to prevent disconnection of the latches.

In this preferred embodiment of my invention I have shown the holding means for the latches as comprising a pair of bars at opposite sides of a luggage carrier, said bars being secured to the spring supports 25. It will be obvious to those skilled in the art that this and many other details of the invention may be varied without departing from the spirit of the invention, therefore I do not limit myself to the precise structure shown in the drawings and described in the specification but only as indicated in the appended claims.

I have shown a trunk 26 on the luggage carrier which trunk is preferably strapped in place but it will be obvious that other baggage can be carried according to the desire of the user.

I have also shown at 27 a conventional indication of a lock by means of which the rack may be secured in its forward position to prevent accidental displacement or reciprocating movement back and forth as the car starts and stops.

Having thus fully described my said invention, what I claim as new and desire to secure by Letters Patent, is:

1. A disappearing luggage carrier for vehicles comprising a rack slidably mounted at the rear of a vehicle body, a stop at the front end thereof to limit its rearward movement, a member at the rear end matching and forming a continuation of the outer covering of the body, and a lock for securing the rack with the said member in matching position, substantially as set forth.

2. A disappearing luggage carrier for vehicles comprising a rack slidably mounted at the rear of a vehicle body, a member at the rear end matching and forming a continuation of the outer covering of the body, and means for securing the rack with the said member in matching position, substantially as set forth.

3. A disappearing luggage carrier for automobiles comprising a rack, lateral guides underneath the body for supporting the rack, latches swingably supported on the rack adapted to hold it in projected position, and spring means for holding said hooks in inoperative position, substantially as set forth.

4. A luggage carrier for automobiles comprising a rack, lateral guides underneath the body for supporting the rack, latches swingably supported at the rear end of the rack, a luggage carrier having side bars secured to the automobile frame underneath which the latch may engage, substantially as set forth.

5. A luggage carrier for automobiles comprising a rack, lateral guides underneath the body for supporting the rack, a longitudinal pivot on said rack, a pair of coiled springs on the pivot, a latch on said pivot between said coiled springs, and means fixed to the body for engagement by the latch to hold the carrier in projected position, substantially as set forth.

6. A luggage carrier for automobiles comprising a rack, lateral guides underneath the body for supporting the rack, latches swingably supported at the rear end of the rack adapted to hold the carrier in projected position, latches swingably supported by the carrier for engagement with fixed abutments on the vehicle body to hold the carrier in place, and means connected to the latches for yieldably opposing movement of the carrier longitudinally of the vehicle, substantially as set forth.

7. A luggage carrier for automobiles comprising a rack supported for horizontal movement, and means holding it in projected position said means yieldably opposing movement away from such position, substantially as set forth.

8. A disappearing luggage carrier for vehicles comprising a rack slidable into and out of operative position on an automobile body, a yieldably mounted latch carried by the rack for yieldably securing said rack in operative position but permitting slight longitudinal movement of the rack.

In witness whereof, I have hereunto set my hand and seal at Seattle, Washington, this 7th day of May, A. D. nineteen hundred and twenty-three.

WILLIAM A. KING. [L. S.]